United States Patent Office 3,338,872
Patented Aug. 29, 1967

3,338,872
PROCESS OF PREPARING ACRYLAMIDE-FORM-
ALDEHYDE COPOLYMERS USING IONIC CAT-
ALYSTS AND NON-AQUEOUS ORGANIC SOL-
VENTS, AND THE RESULTANT THERMALLY
STABLE COPOLYMER COMPOSITION
Kornel D. Kiss, University Heights, and James W. L.
Fordham and Jerry T. Reed, Mentor, Ohio, assignors
to Diamond Alkali Company, Cleveland, Ohio, a cor-
poration of Delaware
No Drawing. Filed July 29, 1963, Ser. No. 298,429
16 Claims. (Cl. 260—72)

This invention relates to novel thermoplastic composi-
tions of matter. More particularly, it relates to copolymers
structurally related to polyoxymethylene having a high
degree of thermal stability.

Oxymethylene polymers have in recent years become
well known in the art. They are prepared by polym-
erizing, under substantially anhydrous conditions, either
formaldehyde or trioxane, which is a cyclic trimer of
formaldehyde, or by polymerizing other oligomers of
formaldehyde. Oxymethylene polymers are thermoplastic
materials which are composed of recurring oxymethylene
—$CH_2O$— units, joined together in linear chains which
may be terminated at one or at both ends by thermally
unstable hydroxyl groups depending upon the method of
preparation. When exposed to elevated temperatures
which are encountered during processing, these polymers
typically will be degraded or decomposed in varying de-
grees. To minimize degradation, therefore, these mate-
rials prior to being processed are usually further treated
such as by chain end-group "capping," i.e., by convert-
ing the unstable hydroxyl groups to more stable ester or
ether groups and/or by incorporating therewith addi-
tives which will inhibit polymer degradation to a sub-
stantial degree.

It is an object of this invention, therefore, to provide
a polymeric composition structionally related to polyoxy-
methylene which may be processed as prepared without
being further treated to stabilize it against thermal degra-
dation.

It is another object of this invention to provide a com-
position having a high degree of thermal stability which
suitably may be employed to prepare tough and durable
plastic articles such as films, moldings, extrusions and
the like.

It is a further object of this invention to provide an
economical, convenient process for preparing useful,
thermally stable oxymethylene copolymers.

It is still another object to provide tough and durable
plastic articles, such as described above, from an oxy-
methylene copolymer composition having a high degree
of thermal stability.

These and other objects are accomplished by polym-
erizing, under substantially anhydrous conditions and in
the presence of an ionic-type polymerization catalyst, a
monomeric mixture comprising as the major constituent,
formaldehyde and, as the minor constituent, an acrylic
monomer having the structure.

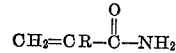

wherein R is selected from the group consisting of H and
$CH_3$, the acrylic monomers having the defined structure
and specifically employed in this invention being acryl-
amide and methacrylamide.

More specifically, the present invention involves the
preparation of useful, easily workable formaldehyde co-
polymer compositions by polymerizing, under conditions
as stated above, a monomeric mixture containing, by
weight, from 60 to 99 percent of formaldehyde in combi-
nation with from 1 up to 40 percent of the particular
acrylic monomer as specified above, i.e., acrylamide and
methacrylamide, said process being conducted at a tem-
perature within the range of —80° to +100° C. The
copolymer products obtained are solid, medium to high
molecular weight materials which exhibit inherently a
high degree of thermal stability, being not subject to
substantial weight reduction, i.e., decomposition or degra-
dation, when exposed to temperatures of at least 200° C.
or above, contrary to the significant or complete decom-
position evidenced by unstabilized polyoxymethylenes
prepared by similar processes and tested at these same
temperatures. Thus, the copolymers of this invention may
be fabricated at the required elevated temperatures with-
out first being stabilized as by "capping" of their end
groups. Additionally, these copolymers also may be proc-
essed without the use of stabilizing additives therewith.

As designated herein, the thermal stability of the co-
polymers of this invention is the value representing the
constant rate at which these copolymers degrade at an
elevated temperature at which degradation can be easily
and accurately measured. Accordingly, the values of the
reaction rate constant for thermal degradation in this
invention have been determined at 220° C. In the art it
is common to designate chemical reactions as first-order,
second-order, etc. depending upon the number of mole-
cules which either enter into or are formed in the re-
action. Likewise, the reverse phenomenon, that is to say,
the decomposition or breakdown of the material follow-
ing a first-order reaction may mathematically be ex-
pressed by the differential equation:

$$\frac{-dw}{dt} = kw$$

wherein $t$ equals the time elapsing from the beginning of
the reaction, $w$ is the weight of the material which re-
mains undecomposed at time $t$, and $k$ is a rate constant
for the equation. In general, the copolymers of this in-
vention have evidenced a thermal degradation which
closely correlates a first-order reaction as expressed by
the above equation. Thus, the $k$ value in the equation is
used herein to characterize the thermal stability of the
copolymers of this invention. These copolymers are con-
sidered satisfactory if they have a value for $k$ for a ther-
mal degradation reaction at 220° C. ($k_{220}$) of 1 percent
per minute or less.

The value of the reaction rate constant for thermal
degradation is measured herein by means of thermogravi-
metric analysis, using a Stanton Automatic Recording
Thermobalance, High Temperature Model, having a plati-
num/rhodium bifilar wound furnace. For the test, 200
milligrams of the copolymer is weighed into a 16 mm. x 20
mm. crucible which is then placed on the platform of a
movable, heat-resistant cyclindrical rod connected to the
balance mechanism. The furnace of the instrument is pre-
heated to a temperature at which the rate of thermal de-
gradation is being determined, e.g., 220° C., and is purged
with inert gas such as nitrogen. When the furnace has
reached the desired temperature and an inert atmosphere
has been established therein, the copolymer sample is
introduced into the furnace by moving the furnace downward into position. Thereafter, during the heat treatment, the temperature of the copolymer sample being maintained, its decomposition as measured by loss in weight, and the time of the test in minutes are automatically recorded. After the test, the decomposition rate is obtained by plotting, as the ordinate, the logarithm of the weight percent of the remaining undegraded copolymer versus the corresponding time of oven exposure. From these plotted values can be drawn a decomposition curve which indicates that the copolymer degrades initially at a very fast rate after which degradation proceeds at a slower, even rate throughout the major portion of the degradation period. This latter period characterizes the true nature of the copolymer. The fast, spasmodic degradation exhibited initially by the copolymer occurs for about the first ten minutes of the degradation test. Accordingly, the reaction rate constant, $k$, for thermal degradation of the copolymers of this invention is selected from that portion of the degradation curve which represents the weight loss or degradation of the copolymer after the first-order decomposition has started. The $k$ value is expressed in weight percent per minute.

While we do not desire to be bound by any particular theory with regard to the manner in which copolymerization is effected, it is believed that in the presence of ionic-type polymerization catalysts employed herein and which are described more fully hereinafter, the acrylic monomer is incorporated into the copolymer chain through a carbon and nitrogen bond, being interspersed in the copolymer between oxymethylene units or groups as represented by the following structure:

I.

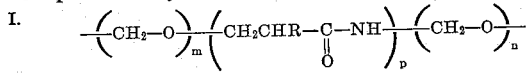

wherein R is selected from the group consisting of H and $CH_3$; and $m$, $n$ and $p$ are each integers of at least 1. Acrylic monomer units of this structure, which are designated herein as 1,4-type units, thus differ from units derived in a typical vinyl polymerization employing free-radical catalysts as used heretofore. In such polymerizations, addition proceeds through the carbon-to-carbon double bond of the monomer and the resulting product formed contains monomer units which are designated herein as 1,2-type units, the structure of which is described more fully hereinafter. Substantiating our belief, amido groups supplied by the 1,4-type units, defined above, are present in the copolymer, as evidenced by analytical data. The 1,4-type acrylic monomer units may be present in the copolymer chain as single units, i.e., where the value of $p$ in the above structure is 1, and/or may be present therein as comonomer blocks, i.e., segments of the chain comprising at least 2 of the said acrylic monomer units sequentially joined together with no oxymethylene unit between them. If present in the copolymer, these 1,4-type comonomer blocks will have a structure analogous to that of a β-alanine homopolymer.

However, it will easily be recognized by those skilled in the art that minute traces of oxygen, water and other impurities may be present in the polymerization system, being not completely removed, for example, from the monomers or from the reaction medium and/or being unavoidably introduced at various times during the reaction. These contaminants may react with some of the ionic catalysts to form free-radical generating compounds which cause the acrylic monomer to add through the carbon-to-carbon double bond. In the copolymers of this invention, therefore, the acrylic monomer may likewise be incorporated into the chain through the 1,2-position as described previously, the said acrylic monomer units being interspersed between oxymethylene groups as represented by the following structure:

II.

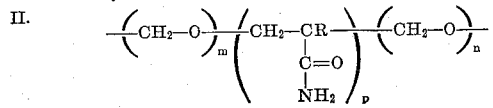

wherein R is selected from the group consisting of H and $CH_3$; and $m$, $n$ and $p$ are each integers of at least 1. These 1,2-type acrylic monomer units may be present in the copolymer chain either as single groups or as comonomer blocks, as in the case of the 1,4-type units described above.

It is also possible that imidization by internal cyclization may occur in acrylic comonomer blocks between 1,2-type units as follows:

III.

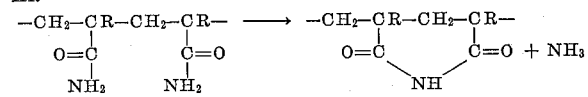

wherein R is selected from the group consisting of H and $CH_3$. Likewise, it is possible that cross-linking or condensation between amino groups of the 1,2-type acrylic monomer units may occur with the loss of $NH_3$, which reaction proceeds as follows:

V.

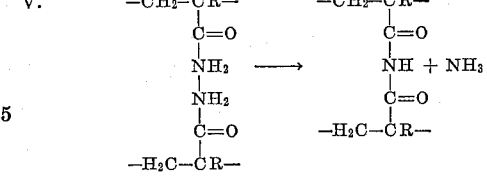

wherein R is as defined above.

As previously stated, the copolymers of this invention are medium to high molecular weight materials. In order to produce finished plastic articles having useful property levels, these copolymers usually have an inherent viscosity of at least 1, which value corresponds to an average polymer molecular weight of approximately 15,000. Inherent viscosity is determined by dissolving the polymer in p-chlorophenol, containing by weight 2 percent of a-pinene, and then measuring at 60° C. the viscosity of the polymer solution relative to that of the p-chlorophenol obtained in the same manner. The time efflux through the viscometer is measured for the solvent and for the solution of polymer in solvent. The concentration of polymer in the solution is 0.5 g. per 100 g. of solution. From the efflux values obtained, inherent viscosity is calculated as follows:

$T_0$ = solvent flow time in seconds $T_1$ = solution flow time in seconds

Relative viscosity = $\dfrac{T_1}{T_0}$ and

Inherent viscosity = $\dfrac{\text{the natural logarithm of relative viscosity}}{C}$ where C is the concentration of polymer as expressed in grams per 100 g. of solution.

Copolymers from which products having the most useful property levels are prepared usually have inherent viscosities of at least 1.2, which value corresponds to an average polymer molecular weight of about 30,000.

Depending upon the percentage of acrylic monomer present in the copolymer products of this invention, these materials have melting points significantly lower than, or approximately the same as oxymethylene homopolymer, i.e., these copolymers have melting points within the range of 100° to 180° C. Of particular advantage is the face that these materials, in many instances, have softening points substantially lower than their melting points and thus may be processed over a wider and less critical temperature range than is possible when processing oxymethylene homopolymers. In appearance, the copolymers resemble polyoxymethylene and those having similar melting points likewise exhbit similar properties.

The copolymer products of this invention generally may contain from about 1 percent, by weight, up to about 40 percent, by weight, of the acrylic monomer, which percentage is determined by elemental nitrogen analysis of the copolymer. That is to say, these copolymers may contain from about 0.4 up to about 22 mole percent of acrylic monomer groups or units or from about 0.4 up to about 22 percent of recurring acrylic monomer units. The preferred copolymers contain from about 0.4 up to 10 percent of the said recurring acrylic monomer units and from about 90 up to 99.6 percent of recurring oxymethylene units.

Infrared analysis is employed herein to characterize the chemical structure of the copolymers of this invention, particularly with regard to the presence of 1,4-type acrylic monomer units therein. Techniques used to analyze materials by infrared spectroscopy are familiar to those skilled in the art, and, as applied herein, are accomplished employing a Perkin-Elmer spectrophotometer, Model 21, operated under standard conditions. All analyses are made in the wave-length region of 2 to 9.5 microns ($\mu$), the —C=O—NH— absorption band contributed by the 1,4-type acrylic monomer units appearing in the region of 5.9 to 6.0$\mu$ and of 6.5 to 6.6$\mu$. Examination of the spectra obtained shows the presence of these bands in each of the copolymers tested, indicating that the 1,4-type monomer units are present in these copolymers.

The copolymerization reaction is effected in the presence of an ionic-type catalyst selected from compounds such as alkali metals, e.g., lithium, sodium, potassium and the like; alkoxides of alkali metals such as the methoxides, tertiary butoxides, etc. of lithium, sodium, or potassuim; organometallic compounds such as butyl lithium, diethyl zinc, tributyl boron, phenyl magnesium bromide, ethyl aluminum dichloride and the like; and Ziegler-Natta catalysts which are now well known in the art, and are commonly used for the preparation of stereoregular olefin polymers, such catalysts comprising, for example, complexes between halides of transition metals of Groups IV to VI of the Periodic Chart of Elements, and metals of Groups I to III, or organic compounds of such metals. Alkali metal catalysts may be employed in either the solid state or as dispersions in saturated hydrocarbons. The alkalimetal alkoxides and the organometallic compounds are typically employed as solutions in suitable solvents, while the Ziegler-Natta catalysts are utilized as suspensions in inert hydrocarbon solvents. In general, the amount of catalyst employed in the process may vary from about 0.001 to 10 millimols per liter of reaction medium, although it is preferable to employ about 0.005 to 5 millimols per liter.

The reaction may be conducted in any inert anhydrous organic solvent for the monomers and for the catalysts and which is a liquid at the reaction temperature. Suitable solvents include aliphatic, cycloaliphatic and aromatic hydrocarbons, or their halogenated derivatives; ethers and cyclic ethers such as diethyl ether, tetrahydrofuran, dioxane and the like; lactones such as γ-butyrolactone, δ-valerolactone and the like; amides such as dimethyl formamide and diethyl formamide; and heterocyclic solvents as, for example, pyridine. Especially preferred for use are the aliphatic, cycloaliphatic and aromatic hydrocarbons containing from 3 to 12 carbon atoms per molecule, e.g., n-heptane, cyclohexane or toluene, and their halogenated derivatives. Typically, a ratio of 3 to 10 parts solvent for each part of formaldehyde is employed in the reaction.

It is essential that the copolymerization process be conducted under anhydrous, or substantially anhydrous, conditions. Therefore, the catalyst solution employed is prepared and then kept, prior to use, in a nitrogen atmosphere; the liquid reaction medium is dried prior to use and the process is carried out entirely under nitrogen.

In carrying out the reaction, temperatures ranging from −80° to +100° C. and reaction times of from 5 minutes to 30 hours generally may be employed. Preferably, the reaction is conducted at a temperature ranging from about −70° to about +70° C. Typical reaction times are from 1 to 24 hours, with the preferred reaction times being within the range of 2 to 10 hours.

In the process, the order in which the polymerization ingredients are introduced into the reactor is not especially critical, as varied polymerization procedures generally may be employed to prepare the copolymers of this invention. For example, in one embodiment of this invention, the acrylic monomer and the catalyst are added to the reaction medium prior to adding the formaldehyde monomer. In another embodiment, the formaldehyde and the catalyst are added initially to the reactor, the acrylic monomer being introduced periodically in measured additions throughout the reaction period. In other embodiments, the addition of the catalyst likewise may be varied. For example, the catalyst may be added to the reaction mixture after the prescribed amount of formaldehyde being employed has been dissolved therein. Alternatively, the catalyst may be introduced in small measured amounts throughout the reaction period. To realize the highest yields of copolymer product, it has been found particularly advantageous to dissolve the amount of formaldehyde being employed in the reaction mixture prior to adding the catalyst thereto. In some instances, however, the method of adding the formaldehyde at a uniform continuous rate to the polymerization mixture throughout the reaction period has been very satisfactorily employed.

Upon completion of the reaction, the copolymerization mixture is filtered to recover the product precipitate. Before being dried, the product may then be purified by leaching it well with acetone to remove any unreacted acrylic monomer remaining. Additionally, the finished copolymer may be heated briefly at a temperature of 100° to 150° C. to decompose any loose, unstable chain ends.

As shown hereinafter by specific examples, the copolymers of this invention possess inherently a high degree of thermal stability, as evidenced by their insignificant weight loss, i.e., decomposition, when tested for thermal degradation as previously described herein. The excellent stability exhibited by these products is in marked contrast to that of unstabilized polyoxymethylenes prepared by similar processes, which polymers decompose rapidly when subjected to these same temperatures. Thus, it is possible to process the copolymers of this invention as prepared without any further stabilizing treatment such as by chain end-group "capping" and/or incorporating stabilizing additives therewith. However, it is to be understood that these copolymers may be so treated, if desired, without departing from the intended scope of this invention.

The copolymer products of this invention may be used to prepare articles such as moldings, films, sheets, rods, tubes, fibers, filaments and the like by conventional molding, casting and/or extrusion processes such as are practiced at the present time. The finished articles exhibit generally the excellent physical and chemical properties which are typical of articles fabricated from oxymethylene homopolymers. In processing, the copolymers may be used unmodified or, if desired, may have incorporated therewith additives such as antioxidants, fillers, pigments, stabilizers, processing aids and the like which are oftentimes employed when processing such thermoplastic materials.

In order that those skilled in the art may more completely understand the present invention and the preferred methods by which the same may be carried into effect, the following specific examples are offered.

*Example 1*

A 5-liter, four-necked polymerization flask is fitted with an agitator, a thermometer well, a reflux condenser, a rubber serum cap for catalyst injection and with inlet and outlet tubes for the passage of nitrogen and formaldehyde vapors. A condenser jacketed with Dry Ice is attached to the outlet tube. An electrically heated 1-liter, three-necked flask, used as a pyrolyzer to supply formaldehyde monomer to the polymerizer, is fitted with a thermometer well and with gas inlet and outlet tubes and is connected to the polymerization flask by means of a U-tube 1 inch in diameter and about 10 inches long, positioned in a Dewar flask. Nitrogen is purged through the apparatus assembly. Three-hundred g. of trioxymethylene (reagent grade) is then charged to the pyrolyzer, three liters of anhydrous toluene to the polymerization flask and agitation is started. While nitrogen purging is continued through the system, 6 g. of acrylamide monomer is added and dissolved in the solvent by heating the solvent to 50° C. After the acrylamide is dissolved, the flask and its contents are chilled by means of a Dry Ice-acetone bath to −40° C., at which temperature formaldehyde vapors generated from the pyrolyzer are introduced through the U-tube (maintained at a temperature below 0° C.) into the polymerization mixture below the surface of the liquid. The reaction mixture is then cooled to −70° C. and is maintained at this temperature for an additional 1½ hours while formaldehyde generation is continued. The formaldehyde generator is then shut down and the reaction mixture is allowed to warm up, attaining a temperature of −10° C. in a time period of 1 hour. At this temperature, 24 ml. of the tributyl boron catalyst (a one-molar solution in toluene) is injected. After the catalyst addition the reaction is continued for 2 additional hours, during which time the temperature of the mixture increases to +30° C. The reaction mixture is then discharged from the polymerization flask, and is filtered to isolate the product precipitate which is then washed well with acetone, refiltered and dried at 60° C. under vacuum. There is recovered 183.4 g. of a very fine, white polymeric material. Chemical analysis shows the product of this example to contain 1 percent nitrogen, which corresponds to an acrylamide content of about 2.2 mole percent in the copolymer. The product has an inherent viscosity of 2.71. As observed in a Fisher-Johns melting point apparatus, the copolymer melts at 165° C. and shows stability up to at least 250° C. The presence of 1,4-type monomer units, as defined hereinbefore, is shown by infrared analysis. The product of this example has a reaction rate constant for thermal degradation at 220° C. of 0.2 percent per minute, 92 percent of the copolymer remaining stable after the initial decomposition is completed. A portion of the copolymer is molded for 1 minute at a temperature of 180° C. under a pressure of 4000 p.s.i. to prepare an extremely tough, white, opaque 2 x 4 x ⅛-inch specimen molding which shows no evidence of thermal degradation.

*Example 2*

Employing polymerization apparatus similar to that employed in Example 1 but with 2-liter flasks, a copolymer is prepared from 100 g. of trioxymethylene and 2 g. of acrylamide and with 1000 ml. of anhydrous toluene as the reaction medium. The general procedure as outlined in Example 1 is followed. In this example, the acrylamide solution is cooled to −70° C. before the formaldehyde vapors are introduced into the polymerizer and the reaction mixture is then maintained at this temperature until formaldehyde addition is discontinued. The mixture is then slowly warmed to −10° C. before 8 ml. of a one-molar solution of tributyl boron catalyst in toluene is added. After catalyst addition, copolymerization is effected in a time period of 3 hours, during which time the temperature of the reaction mixture increases to 25° C. The copolymer product is reclaimed as described in Example 1.

Forty-one and six-tenths g. of a fine, white product is obtained which is found by chemical analysis to contain a total acrylamide content of 2.8 mole percent. This copolymer has an inherent viscosity of 1.71. It exhibits melting characteristics similar to the product of Example 1, melting at 170° C. and showing substantial stability to at least 230° C. 1,4-type monomer units are observed in the infrared spectrum of the copolymer. This product has a reaction rate constant for thermal degradation at 220° C. of 0.4 percent per minute, remaining 85 percent stable after being heated at this temperature for 20 minutes. A portion of the copolymer molded under conditions similar to the product of Example 1 produces a tough, white specimen molding exhibiting no thermal degradation.

*Example 3*

Employing the polymerization apparatus used in Example 2, a formaldehyde-acrylamide copolymer is prepared using 100 g. of trioxymethylene, 2 g. of acrylamide monomer and 1000 ml. of anhydrous toluene as the reaction medium. In this example, while formaldehyde generation is continued throughout the reaction, the acrylamide monomer is added periodically, being introduced as a solution in toluene. The assembled apparatus is purged with nitrogen, after which the solvent and the trioxymethylene are charged to the system. While nitrogen purging is continued, the solvent is cooled to 4° C. and 100 ml. of a 1-percent solution of acrylamide in toluene is added to the polymerization flask. Eight ml. of a one-molar solution of tributyl boron catalyst in n-heptane is then added, after which formaldehyde vapors generated from the pyrolyzer heated at 130° C., are introduced into the polymerizer below the surface of the liquid. Forty ml. of the acrylamide solution is added to the polymerization mixture one hour after formaldehyde vapors have been introduced into the polymerizer, 60 ml. of the acrylamide solution being added one hour after the first monomer addition. After the second addition of acrylamide the temperature of the reaction mixture increases to 10° C. and is maintained at this temperature for an additional two hours, making a total reaction time of 4 hours. The reaction mixture is then discharged from the polymerizer and the copolymer product is reclaimed, as described in the previous examples. Twenty-three and six-tenths g. of a fine, white product is obtained which is found, by chemical analysis, to contain a total acrylamide content of 4.85 mole percent. This copolymer product begins to soften at 126° C., melts at 160° C. and with continued heating, shows substantial stability up to at least 230° C. The copolymer has an inherent viscosity of 2.09. It has a reaction rate constant for thermal degradation at 220° C., ($k_{220}$) of 0.44 percent per minute. Infrared analysis of the copolymer, as described hereinbefore, shows the presence of 1,4-type monomer units. This copolymer product may be molded under conditions, as outlined in the previous examples, to prepare tough, white molded specimens.

*Example 4*

A formaldehyde copolymer is prepared using the polymerization apparatus of Example 2. In this example, 360 g. of triovymethylene, 12 g. of acrylamide monomer, 1250 ml. of anhydrous toluene and 1 g. of sodium tertiary butoxide are used in the reaction. Two-tenths g. of N-phenyl 2-naphthyl amine is used as a free-radical scavenger in the system to inhibit the polymerization of acrylamide by a free-radical mechanism. The trioxymethylene is charged to the pyrolyzer; the toluene, acrylamide monomer, sodium tertiary butoxide catalyst and the N-phenyl 2-naphthyl amine are charged to the polymerization flask and agitation is started. The system is purged with nitrogen which is then continued at a low flow rate throughout the reaction to provide an oxygen-free atmosphere. The polymerization flask and its contents are heated to 90° C. to dissolve the acrylamide, the reaction mixture is then cooled to 30° C., at which temperature formaldehyde vapors are introduced at a uniform, continuous rate into the polymerizer below the surface of the liquid. The reaction is carried out for a time period of 3½ hours, during which time the temperature of the reaction mixture gradually increases to 49° to 50° C. The polymerization mixture is discharged from the polymerizer and is filtered to separate the product precipitate. This material is then washed with acetone, filtered, leached with hot water, filtered and again washed with acetone and refiltered. It is then dried at 50° C. under vacuum. Sixty-two and six-tenths g. of a fine, white powder is obtained which melts at 163° C. and shows substantial stability up to approximately 250° C. This product contains approximately 4.4 mole percent of acrylamide. A white, smooth, strong specimen molding is prepared by molding a portion of this product for 1 minute at 155° C. under a pressure of 4000 p.s.i.

*Example 5*

A one-liter, four-necked polymerization flask is fitted with an agitator, a thermometer well, a reflux condenser, a rubber serum cap for catalyst injection, and with inlet and outlet tubes for passage of nitrogen and formaldehyde vapors. An electrically heated, one-liter, three-necked flash used as a pyrolyzer to supply formaldehyde monomer to the polymerizer is fitted with a thermometer well and with gas inlet and outlet tubes and is connected to the polymerization flask by means of a U-tube 1 inch in diameter and about 10 inches long positioned in a Dewar flask. Eighty g. of trioxymethylene (reagent grade) is charged to the pyrolyzer, 500 ml. of anhydrous n-heptane is charged to the polymerization flask and agitation is started. Nitrogen is passed through the system and is continued at a low rate of flow throughout the reaction to provide an oxygen-free atmosphere. Five g. of acrylamide is added to the polymerizer, after which the flask and its contents are cooled to −70° C. by means of a Dry Ice-acetone bath. Two ml. of a one-molar solution of butyl lithium in n-heptane are added to the polymerizer. Formaldehyde vapors generated by pyrolizing the trioxymethylene are then passed through the U-trap (maintained at a temperature below 0° C.) at a uniform continuous rate into the polymerizer above the surface of the liquid.

After the introduction of the formaldehyde vapors, the reaction is carried out for a period of 4 hours, during which time the temperature of the reaction mixture is maintained at −70° C. The formaldehyde generator is then shut down and the reaction mixture is warmed to room temperature before nitrogen purging is discontinued. The mixture is then discharged from the polymerizer, filtered to recover the product precipitate which is then washed well with n-heptane, washed with acetone, filtered and dried at 50° C. under vacuum. Ten and seven-tenths g. of a fine, white polymeric material is obtained. This product contains, as determined by chemical analysis, 1.47 percent nitrogen which value corresponds to an acrylamide content of about 3.2 mole percent. The copolymer softens at 165° C., melts at approximately 175° C. and exhibits no discoloration or other evidence of thermal instability below 240° C. This material has a reaction rate constant for thermal degradation at 220° C. of 0.5 percent per minute. Tough, white and opaque specimen moldings may be obtained, as in previous examples, by molding portions of this copolymer for 1 minute at 180° C. and under a pressure of 4000 p.s.i.

*Example 6*

An oxymethylene homopolymer is prepared employing the polymerization apparatus and procedure, as outlined in Example 5. In this example, 80 g. of trioxymethylene, 500 ml. of anhydrous n-heptane and 2 ml. of the one-molar solution of butyl lithium catalyst in n-heptane are employed. After charging the trioxymethylene and the n-heptane to the apparatus, as described in Example 5, the polymerization flask and the solvent are cooled to −70° C. before injecting the catalyst solution into the reactor. After formaldehyde vapors are initially introduced, the reaction is carried out for a period of 4½ hours. During this time the reaction mixture gradually warms to a temperature of −50° C. and is then warmed further by gentle heating to a final temperature of +60° C. At the end of the reaction period, the formaldehyde generator is shut down and the reaction mixture is cooled to room temperature before nitrogen purging is discontinued. The reaction mixture is then discharged from the polymerizer and filtered to recover the polymeric product which is washed well with n-heptane and dried at 50° C. under vacuum. Ten and four-tenths g. of oxymethylene polymer is recovered. This polymer melts sharply at 186° C. When tested for thermal stability by thermogravimetric analysis, as described previously herein, this polymer exhibits a reaction rate constant for thermal degradation at 220° C. ($k_{220}$) of 3.5 percent per minute, decomposing at a steady, rapid rate throughout the determination. The material is completely decomposed and disappears about 35 minutes after the test has started. This oxymethylene homopolymer thus shows significantly poor stability by comparison to the formaldehyde-acrylamide copolymer products of the previous examples which exhibit a reaction rate constant for thermal degradation of less than 0.5 percent per minute. When the homopolymer is molded under conditions as outlined in the previous examples, badly distorted dull pieces of opaque material are obtained. These pieces are brittle and appear somewhat porous in nature, as if partially foamed by gaseous formaldehyde monomer evolved by decomposition of the polymer during heating.

*Example 7*

Employing the polymerization apparatus of Example 5, 80 g. of trioxymethylene are charged to the pyrolyzer and 500 ml. of anhydrous n-heptane, 5 g. of acrylamide monomer and 0.25 g. of sodium methoxide catalyst are charged to the polymerization flask at ambient temperature. The polymerization system is then purged with nitrogen which is continued at a low flow rate throughout the reaction to provide an oxygen-free atmosphere. While agitation is continued, the polymerization flask and its contents are heated to 87° C., during which time formaldehyde vapors are introduced at a uniform continuous rate into the polymerizer above the surface of the liquid. The reaction mixture is maintained at a temperature of 87° to 98° C. for a period of 3½ hours. During this time period the catalyst is added in two additional 1 g. portions after the reaction has been conducted for 1 hour and for 2 hours.

At the end of the reaction period the copolymer product is recovered as in Example 5. About 6 g. of a very fine, white polymeric material is obtained which is elastic in nature. It contains approximately 21.5 mole percent of acrylamide as shown by chemical analysis. This copolymer gradually softens from 30° to 210° C. melts at a slightly higher temperature. It exhibits a reaction rate constant for thermal degradation at 220° C. of 0.14 percent per minute. It is molded at 185° C. and under a pressure of 4000 p.s.i. The specimen moldings obtained show a high degree of thermal stability.

*Example 8*

Employing the polymerization apparatus, as described in Example 5, a formaldehyde-methacrylamide copolymer is prepared using 2 g. of methacrylamide monomer, 1.3 g. of a lithium suspension (37 percent lithium in a saturated hydrocarbon wax), 0.1 g. of N-phenyl-2-naphthylamine and 2 ml. of butanol. In this example the n-heptane, the butanol and the naphthylamine are charged to the polymerization flask and stirred thoroughly. The lithium catalyst is then added and thoroughly mixed into the polymerization mixture. The methacrylamide monomer is then added to the polymerization mixture which is heated to a temperature of 90° C. and then cooled to −70° C. by a Dry Ice-acetone cooling bath. Formaldehyde vapors are introduced at this temperature at a uniform, continuous rate into the polymerizer above the surface of the liquid. The reaction mixture is maintained at −70° C. for 1 hour, and is then allowed to warm gradually to a temperature of +70° C., at which time the reaction is discontinued. The total time of the reaction, after the formaldehyde monomer has first been introduced into the polymerizer, is 3½ hours. At the end of the reaction period, the copolymer product is recovered, as described in previous examples. Five and one-half g. of product is obtained which contains 0.7 mole percent of methacrylamide as determined by chemical analysis. This material softens at 170° C. and melts at 190° C. It has a reaction rate constant for thermal degradation at 220° C. of 0.28 percent per minute. It is molded for 1 minute at 180° C. and under 4000 p.s.i. to prepare tough specimen moldings which are off-white to light tan in color.

It is to be understood that although the invention has been described with specific reference to particular embodiments thereof, it is not to be so limited, since changes and alterations therein may be made which are within the full intended scope of this invention as defined by the appended claims.

What is claimed is:

1. A normally solid thermoplastic copolymer having a high degree of thermal stability consisting essentially of from about 78 up to 99.6 percent of recurring oxymethylene units and from about 0.4 up to about 22 percent of recurring units derived from an acrylic monomer, said units having at least one structure selected from the group consisting of

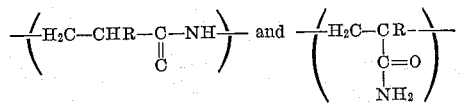

wherein each R is selected from the group consisting of H and CH$_3$.

2. The copolymer composition of claim 1 having an inherent viscosity of at least 1 which contains from about 90 to 99.6 percent of recurring oxymethylene units and from about 0.4 up to 10 percent of recurring units derived from the said acrylic monomer, the said copolymer composition having a reaction rate constant for thermal degradation at 220° C. of no more than 1 percent per minute.

3. A process for preparing a copolymer composition having a high degree of thermal stability which comprises polymerizing, under substantially anhydrous conditions and in the presence of an ionic-type polymerization catalyst, a monomeric mixture consisting essentially of formaldehyde as the major constituent, and as the minor constituent, an acrylic monomer having the structure

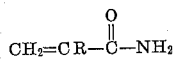

wherein R is selected from the group consisting of H and CH$_3$; and recovering a solid copolymer containing from about 78 up to about 99.6 percent of recurring oxymethylene units and from about 0.4 up to about 22 percent of recurring units derived from the acrylic monomer, said units having at least one structure selected from the groups consisting of

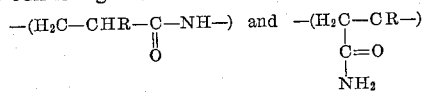

wherein each R is selected from the group consisting of H and CH$_3$.

4. The process of claim 3 in which the acrylic monomer is acrylamide.

5. The process of claim 3 in which the acrylic monomer is methacrylamide.

6. A process for preparing a copolymer composition having a high degree of thermal stability which consists essentially of copolymerizing in an inert organic liquid reaction medium, under substantially anhydrous conditions, for a time period of 5 minutes to 30 hours, at a temperature within the range of −80° to +100° C. and in the presence of an ionic-type polymerization catalyst selected from the group consisting of alkali metals, alkoxides of alkali metals and organometallic compounds, formaldehyde with an acrylic monomer having the structure

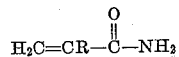

wherein R is selected from the group consisting of H and CH$_3$; and recovering a solid copolymer containing from about 78 up to 99.6 percent of recurring oxymethylene units and from about 0.4 up to about 22 percent of recurring units derived from the said acrylic monomer said units having at least one structure selected from the groups consisting of

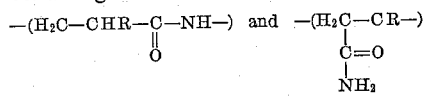

wherein each R is selected from the group consisting of H and CH$_3$.

7. The process of claim 6 in which the catalyst is tributyl boron, employed in an amount ranging between 0.001 to 10 millimols per liter of reaction medium.

8. The process of claim 6 in which the catalyst is butyl lithium employed in an amount ranging between 0.001 to 10 millimols per liter of reaction medium.

9. A process for preparing a copolymer composition having a high degree of thermal stability which comprises the steps of introducing, under substantially anhydrous conditions, formaldehyde monomer into a mixture consisting essentially of acrylic monomer and an inert organic liquid reaction medium, said mixture being agitated and maintained at a temperature within the range of −70° and +70° C.; continuing the addition of formaldehyde monomer to the said mixture until a prescribed amount of formaldehyde has been dissolved therein; thereafter adding to the resulting monomer solution from about 0.001 to 10 millimols per each liter of liquid reaction medium of a polymerization catalyst selected from the group consisting of alkali metals, alkoxides of alkali metals and organometallic compounds; continuing agitation of the reaction mixture for a time sufficient to effect polymerization therein; and finally recovering a solid copolymer containing from 78 up to 99.6 percent of recurring oxymethylene units and from about 0.4 up to about 22 percent of recurring units derived from the said acrylic monomer, said units having at least one structure selected from the groups consisting of

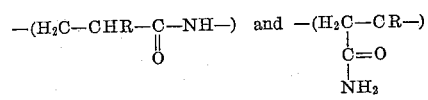

wherein each R is selected from the group consisting of H and CH$_3$, said copolymer composition having a reaction rate constant for thermal degradation at 220° C. of no more than 1 percent per minute.

10. The process of claim 9 in which the acrylic monomer is acrylamide.

11. The process of claim 9 in which the acrylic monomer is methacrylamide.

12. The process of claim 9 in which the catalyst is tributyl boron, employed in an amount ranging between about 1 to about 5 millimols per liter of reaction medium.

13. The process of claim 9 in which the catalyst is butyl lithium, employed in an amount ranging between about 1 to about 5 millimols per liter of reaction medium.

14. The process of claim 9 in which the total reaction time is from 1 to 10 hours.

15. The composition of claim 1 in which the acrylic monomer units are derived from acrylamide.

16. The composition of claim 1 in which the acrylic monomer units are derived from methacrylamide.

References Cited

UNITED STATES PATENTS

| | | | |
|---|---|---|---|
| 2,173,005 | 9/1939 | Strain | 260—72 |
| 2,978,437 | 4/1961 | Christenson | 260—72 |
| 3,116,267 | 12/1963 | Dolce | 260—45.9 |
| 3,131,165 | 4/1964 | Hermann et al. | 260—45.9 |
| 3,163,623 | 12/1964 | Sekmakas et al. | 260—72 |

OTHER REFERENCES

Petroleum Refiner, vol. 41, November 1962 TP 690 A1P4 pp. 147–153.

WILLIAM H. SHORT, *Primary Examiner.*

H. SCHAIN, *Assistant Examiner.*

UNITED STATES PATENT OFFICE
CERTIFICATE OF CORRECTION

Patent No. 3,338,872                        August 29, 1967

Kornel D. Kiss et al.

It is hereby certified that error appears in the above numbered patent requiring correction and that the said Letters Patent should read as corrected below.

Column 4, line 68, for "face" read -- fact --; column 11, lines 32 to 35, in the equation, for

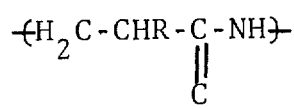             read           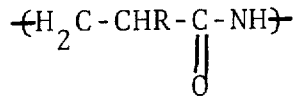

Signed and sealed this 29th day of October 1968.

(SEAL)
Attest:

Edward M. Fletcher, Jr.                    EDWARD J. BRENNER
Attesting Officer                          Commissioner of Patents